(12) United States Patent
Plantan et al.

(10) Patent No.: US 6,354,187 B1
(45) Date of Patent: Mar. 12, 2002

(54) BRAKE ACTUATOR HAVING A DAMPING STONE SHIELD

(75) Inventors: Ronald S. Plantan, Charlotte; Gregory A. Greenly, Harrisburg, both of NC (US)

(73) Assignee: Indian Head Industries, Inc., Charlotte, NC (US)

(*) Notice: Subject to any disclaimer, the term of this patent is extended or adjusted under 35 U.S.C. 154(b) by 0 days.

(21) Appl. No.: 09/628,612

(22) Filed: Jul. 31, 2000

(51) Int. Cl.[7] ............................. F01B 19/00; F16J 3/00
(52) U.S. Cl. ............................................... 92/98 R
(58) Field of Search ............................. 92/98 R, 101, 92/85 R

(56) References Cited

U.S. PATENT DOCUMENTS

| | | |
|---|---|---|
| 3,158,069 A | 11/1964 | Edwards et al. |
| 5,002,164 A | 3/1991 | Bowyer |
| 5,392,691 A | 2/1995 | Schultz |
| 5,460,076 A * | 10/1995 | Pierce et al. .................. 92/48 |

* cited by examiner

*Primary Examiner*—Edward K. Look
*Assistant Examiner*—Michael Leslie
(74) *Attorney, Agent, or Firm*—Howard & Howard

(57) ABSTRACT

A brake actuator having a stone shield located within the brake actuator housing and surrounding the brake actuator piston which dampens the impact of the brake actuator piston against the end wall surrounding the end wall opening. The damping stone shield includes an annular body portion having a diameter less than the brake actuator end wall opening and opening which receives the reciprocal piston of the brake actuator and an integral radial flange which overlies the inner surface of the brake actuator end wall opening. The annular body portion of the stone shield includes a first end portion extending at least partially through the brake actuator end wall opening having an annular groove surrounding the piston and damping the impact of the piston against the end wall surrounding the end wall opening. In the preferred embodiment, the annular groove extends through the first end portion of the stone shield and is bell-shaped or tapered in cross-section having a rounded end surface. The opening through the body portion is preferably hyperbolic having openings at the first and second end portions greater than the mid portion and the second end portion is spaced from the radial flange preferably having a diameter less than the first end portion.

24 Claims, 2 Drawing Sheets

BRAKE ACTUATOR HAVING A DAMPING STONE SHIELD

FIELD OF THE INVENTION

This invention relates to a brake actuator having an improved stone shield which dampens the impact of the brake actuator piston rod against the end wall surrounding the opening through which the piston reciprocates.

BACKGROUND OF THE INVENTION

A conventional brake actuator of the type used for heavy vehicles, including trucks, tractor trailers and buses, includes a brake actuator housing having an end wall, an opening through the end wall and a piston reciprocal through the end wall opening for actuating the braking system of the vehicle. The piston generally includes an enlarged piston head and a piston rod which extends through the end wall opening which is operably connected to the braking system of the vehicle. In a typical application, the free end of the piston rod is connected by a clevis to the arm of a slack adjuster, such that the piston rod moves in an arcuate motion to actuate the brakes. Large vehicles generally include a pneumatic braking system, wherein pneumatic pressure acts directly or indirectly against the head of the piston to drive the piston rod through the end wall opening actuating the brake. In a diaphragm-type brake actuator, the pneumatic pressure of the vehicle braking system reacts against a flexible diaphragm, driving the piston toward the end wall to actuate the brakes. In a piston-type brake actuator, the piston head is sealed against he internal surface of the housing, such that the pneumatic pressure of the braking system reacts directly against the piston head.

A stone shield is generally located within the brake actuator housing surrounding the piston rod which limits the entry of road debris in the brake actuator housing, including road debris, such as dust, stones, ice, etc. Such stone shields are generally formed of a resilient material, such as synthetic rubber, or may be formed of a harder material, such as high density polyethylene. In its simplest form, the stone shield is an annular disk having an opening which receives the reciprocal piston rod. The stone shield may also include an annular end portion which is received through the end wall opening of the brake actuator. Where the stone shield is formed of a resilient material, the stone shield may also provide some damping of the force of the piston rod against the end wall surrounding the end wall opening.

Brake actuators are normally mounted under the vehicle or trailer chassis on a bracket in a generally horizontal orientation of about 20° to 40° from horizontal. As will be understood by those skilled in this art, the brake actuating piston rod continuously impacts the end wall of the brake actuator surrounding the opening through the end wall or the tubular end of the stone shield which extends through the end wall opening as the vehicle encounters normal road conditions. However, when the wheels of the vehicle or tractor trailer are driven over a sudden change in gradient, such as a chuck hole, the impact force may be as much as 40 to 80 Gs, causing damage to the piston or the brake actuator housing. Further, conventional stone shields must be assembled in the brake actuator before attachment of the clevis to the end of the piston rod. There has, therefore, been a long-felt need to dampen the force or impact of the piston rod against the brake actuator end wall surrounding the end wall opening to reduce the resultant damage to the piston rod and the brake actuator housing. The brake actuator having an improved damping stone shield of this invention solves this problem without any substantial increase in cost.

SUMMARY OF THE INVENTION

As set forth above, this invention relates to a brake actuator having an improved stone shield which dampens the impact of the piston rod of a brake actuator against the end wall surrounding the end wall opening through which the piston rod reciprocates during normal braking of the vehicle . The brake actuator may be any conventional brake actuator such as used on heavy vehicles including diaphragm and piston-type brake actuators which include a housing having an end wall, an opening through the end wall and a piston reciprocal through the end wall opening to actuate the vehicle braking system.

The improved damping stone shield of this invention includes an annular body portion having an opening which receives the brake actuator piston and a first end portion extending at least partially through the brake actuator end wall opening, preferably having a diameter less than the brake actuator end wall opening, and formed of a resilient material, such as synthetic rubber. The first end portion of the body portion includes a generally annular groove spaced from the body portion opening generally surrounding the piston rod and damping the impact of the piston rod against the brake actuator end wall surrounding the opening. In the most preferred embodiment of the improved damping shield of this invention, the groove in the first end portion is tapered or bell-shaped in cross-section having a rounded bottom or end wall and the groove extends into the body portion more than halfway through the body portion providing excellent damping of the piston rod against the end wall of the brake actuator and substantially reducing damage to the piston rod and brake actuator housing. In the disclosed embodiment, the stone shield includes a radial flange portion, preferably integral with the annular body portion, which overlies an inner surface of the brake actuator end wall having a diameter greater than the end wall opening. In the most preferred embodiment of the improved damping shield of this invention, the radial flange portion is spaced from a second end of the annular body portion having a diameter less than the diameter of the first end portion and the annular groove extends into the body portion to adjacent the juncture of the radial flange portion and the second end portion. The annular groove through the first end portion of the annular body portion of the stone shield thus converts the impact load of the piston rod from a compressive force to a shear compression force, optimizing the load capacity of the resilient stone shield. The testing of this design of damping stone shield indicates that the improved damping stone shield significantly reduces or eliminates damage to the piston rod and brake actuator housing resulting from significant impact loads as described above.

The preferred embodiment of the damping stone shield of this invention is also preferably split through one side permitting easy installation of the damping stone shield over the piston rod following attachment of the clevis to the free end of the piston rod. In the most preferred embodiment, the opening through the body portion of the stone shield is arcuate in cross-section or hyperbolic, having rounded enlarged openings to accommodate arcuate reciprocal movement of the brake actuator piston. In the preferred embodiment, the outer edge of the radial flange portion of the stone shield is rounded or bullet-shaped in cross-section and the stone shield is enclosed by a generally cup-shaped metal retainer in the brake actuator housing having a generally vertical wall portion surrounding the outer edge of the radial flange portion of the stone shield. Thus, when the piston rod is driven laterally as described above, the outer edge of the radial flange portion of the stone shield first contacts the surrounding wall portion of the retainer, damping lateral movement of the piston rod and reducing damage to the piston rod.

Other advantages and meritorious features of the improved brake actuator having a damping stone shield of this invention will be more fully understood from the following description of the preferred embodiments, the appended claims and the drawings, a brief description of which follows.

DESCRIPTION OF THE PREFERRED EMBODIMENTS

Figures 1, 2:
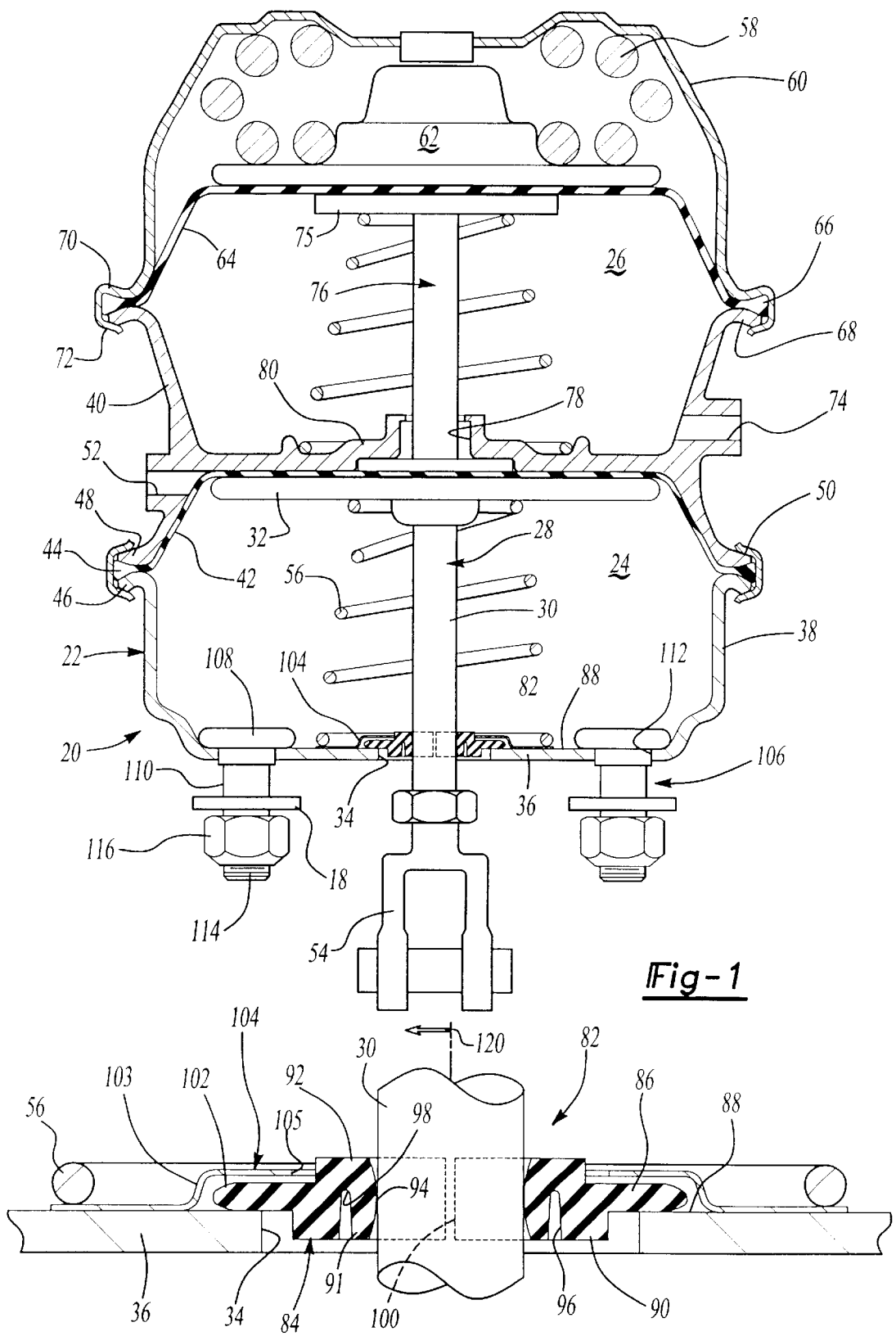
FIG. 1 is a side partially cross-sectioned view of a conventional dual diaphragm brake actuator having one embodiment of the improved damping stone shield of this invention.
FIG. 2 is a partial side cross-sectional view of the brake actuator and damping stone shield shown in FIG. 1.

FIG. illustrates a dual diaphragm spring brake actuator 20 of the type commonly used for braking heavy vehicles, including trucks, trailers and buses. The brake actuator 20 includes a housing 22 defining a service chamber 24 and an emergency or spring chamber 26. The service chamber includes a piston 28 having a piston rod 30 and a piston head 32. The piston rod 30 is reciprocal through an opening 34 in the end wall 36 of the housing member 38 to actuate the braking system of the vehicle as described below. The housing 22 of the disclosed embodiment of the dual diaphragm brake actuator 20 includes an intermediate housing member 40, commonly referred to as a flange case. A flexible cup-shaped diaphragm 42 is supported within the service chamber 24 by a peripheral edge portion 44 secured between the flanges 46 and 48 of the housing member 38 and the flange case 40, respectively. A conventional bolted clamp band 50 is generally used to secure the flanges 46 and 48 together, which retains the peripheral edge 44 of the diaphragm 42 in sealed relation therebetween.

During normal braking, pneumatic pressure is received from the braking system of the vehicle (not shown) through port 52 in the flange case 40. The pneumatic pressure inverts the central portion of the cup-shaped diaphragm 42, driving the piston rod 30 through the opening 34 in the end wall 36 of the housing member 38. A clevis 54 is threadably attached to the free end of the piston rod 30 and the clevis 54 is conventionally attached to the arm of the slack adjuster (not shown) which rotates and actuates the braking system of the vehicle. The reciprocal motion of the piston 28 thus defines an arcuate motion during normal braking of the vehicle. Following braking, the pneumatic pressure of the braking system returns to zero and the return spring 56 reacts against the piston head 32 to return the piston 28 and diaphragm 42 to the position shown in FIG. 1, such that the brake actuator is ready for the next braking operation.

The emergency chamber 26 includes a coiled power spring 48 which reacts against the cup-shaped cover or head 60 and the spring plate 62 for emergency braking of the vehicle and the emergency chamber 26 also serves as a parking brake as described below. The emergency chamber 26 also includes a second cup-shaped diaphragm 64 having a peripheral edge portion 66 which is entrapped between the flanges 68 and 70 of the flange case 40 and the head 60, respectively. In the disclosed embodiment, the free edge 72 of the head 60 is deformed around the flange 68 of the flange case 40 and deformed radially inwardly or crimped to form a tamper-resistant assembly as disclosed in U.S. Pat. No. 4,960,036 assigned to the Assignee of the present Application. During normal operation of the vehicle, pneumatic pressure is received through port 74 in the flange case 40 pressurizing the emergency chamber 26 maintaining the power spring 58 in its compressed condition as shown in FIG. 1. However, when the pneumatic pressure of the braking system fails or falls below a predetermined minimum, the power spring 58 expands against the spring plate 62, which inverts the cup-shaped diaphragm 64 in the emergency chamber 26, driving the head 75 of the piston 76 downwardly in FIG. 1 through opening 78 in the central web portion 80 of the flange case 40. The piston 76 thus reacts against the diaphragm 42 in the service chamber, driving the piston rod 30 through the opening 34 in the end wall 36 of the housing member 38, actuating the braking system of the vehicle, as described above. When the vehicle is turned off, the pressure in the emergency chamber 26 returns to zero, permitting the power spring 58 to expand and braking the vehicle. The dual diaphragm spring brake actuator 20 thus also serves as a parking brake.

As set forth above, brake actuators of the type encompassed by this invention are normally rigidly mounted to a bracket (not shown) beneath the chassis of the vehicle or trailer in a generally horizontal position, wherein the axes of the pistons 28 and 76 define an angle relative to horizontal of between about 20° to 40° to horizontal. Further, as discussed above, the piston rod 30 is operably connected to the arm of a slack adjuster (not shown), resulting in a slightly arcuate motion for the piston. Thus, the opening 34 through the end wall 36 of the brake actuator housing must be sufficiently large to accommodate this arcuate motion. However, the piston rod 30 is driven against the opening 34 in the end wall 36 as the vehicle or tractor trailer is driven over uneven terrain such as normally encountered by such vehicles. Where the wheels encounter a sudden interruption in the road, such as a chuck hole, the force of the piston rod 30 against the opening 34 may be 40 to 80 Gs, resulting in damage to the push rod and the end wall 36 of the housing. This damage is reduced somewhat by conventional resilient stone shields having a tubular portion received in the opening 34 in the end wall of the housing surrounding the piston rod. However, the damping effect of such resilient stone shields is not sufficient to prevent damage to the piston rod 30 and the end wall 36 of the housing under the severe conditions encountered with brake actuators of this type, particularly under extreme variations in the road surface often encountered by such vehicles including chuck holes and the like, wherein the force driving the piston rod 30 against the opening 34 may be as much as 30 to 60 Gs as described further hereinbelow.

FIGS. 1 and 2 illustrate one preferred embodiment of the damping stone shield 82 of this invention installed in the dual diaphragm spring brake actuator 20 described above. However, all types of brake actuators having a housing and a piston or piston rod 28 extending through an opening 34 in the end wall 36 of the housing encounter the same problem, including brake actuators wherein the service chamber 24 is separate from the spring chamber 26 and piston-type brake actuators. Therefore, the improved damping stone shield of this invention may be utilized with any vehicle brake actuator as described above.

As best shown in FIG. 2, the improved damping stone shield 82 includes an annular body portion 84 preferably having an external diameter smaller than the internal diameter of the opening 34 through the end wall 36 of the brake actuator and a radial flange portion 86, preferably integral with the annular body portion 84, having a diameter greater than the internal diameter of the opening 34, such that the radial flange portion overlies an internal surface 88 of the end wall 36. The damping stone shield 82 may thus move laterally to accommodate the arcuate motion of the piston rod 30 as described above and lateral movement of the piston rod 30. The annular body portion 84 of the damping stone shield includes a first end portion 90 which extends at least partially through the opening 34 in the end wall 36 of the housing and a second end portion 92 located within the service chamber 24 preferably having an external diameter less than the external diameter of the first end portion 90. The first end portion 90 includes a groove 96 extending through the first end portion spaced from the opening 94 which receives the piston rod 30 and which preferably surrounding the piston rod 30 to dampen the force of the piston rod against the internal surface of the opening 34 through the end wall 36 as described below. The damping stone shield 82 is most preferably formed of a resilient material such as rubber or synthetic rubber, and most preferably formed of a resilient polymeric material able to withstand the extreme conditions to which brake actuators of this type are subjected, including extreme temperature variations and road debris. A suitable material for the damping stone shields of this invention is Sanoprene 200. The damping stone shield of this invention may thus be injection molded from Sanoprene 200, wherein the side walls of the groove 96 are preferably tapered or inclined toward the first end portion 90 and the end surface 98 is rounded to permit easy removal of the stone shield from the mold and provide superior damping. Further, the resilient damping stone shield 82 is preferably split through one side as shown at 100 to permit assembly of the stone shield on the piston rod 30 following attachment of the clevis 54 to the end of the piston rod 30. The outer edge of the flange portion 86 may be tapered or rounded as shown at 102 improving damping and reducing stress, as further discussed below.

As shown in FIGS. 1 and 2, a cup-shaped metal stone shield retainer 104 is assembled on the inner surface 88 of the end wall 36 over the damping stone shield 82 to center the stone shield and the return spring 56. Centering retainers of this type have also been used with conventional stone shields. As described above, vehicle brake actuators are normally mounted to a bracket (not shown) in a generally horizontal orientation beneath the vehicle or trailer chassis. In a conventional installation, the brake actuator is mounted to a bracket by a plurality of mounting bolts 106 shown in FIG. 1. The mounting bolts 106 typically include a head portion 108 overlying the internal surface of the end wall 36 and a shank portion 110 received through openings 112 in the end wall of the brake actuator. The shank portion is received through openings in the mounting bracket (not shown) and the end portion 114 is threaded to receive a nut 116 and a washer 118, such that the brake actuator 20 is rigidly mounted to the bracket attached to the undercarriage adjacent the braking system of the vehicle or trailer (not shown). Because brake actuators are normally mounted in a generally horizontal orientation, generally between about 20° and 40° to horizontal, the lateral force exerted against the piston rod 30 shown by arrow 120 in FIG. 2 is generally as great as the vertical force acting on the vehicle axles during interruptions of the road surface, which may be as great as 40 to 60 Gs when the vehicle encounters a chuck hole or the like. As set forth above, this force is often sufficient to bend the piston rod 30 or damage the end wall 36 surrounding the opening 34 which may render the brake actuator inoperative and require replacement of the piston 28 or the housing 38.

The improved stone shield of this invention reduces or eliminates damage to the piston and housing by damping the force of the piston rod 30 against the internal surface of the opening 34 through the end wall 36. In the most preferred embodiment, the annular groove 96 completely surrounds the opening 94 through the annular body portion 84 and the piston 30. In the most preferred embodiments of the damping stone shield 82, the annular groove 96 extends from the first end 90 at least halfway through the annular body portion and more preferably to adjacent the juncture of the radial flange portion 86 and the second end portion 92, such that the inner portion 91 of the first end portion 90 flexes and absorbs a substantial portion of the impact force. Further, the second end portion 92 preferably has an external diameter less than the first end portion to facilitate this flexure and the first end portion 90 is preferably thicker to further cushion the impact of the piston rod 30 against the internal wall of the opening 34. The internal surface of the opening 94 through the annular body portion 84 of the stone shield is also preferably rounded in cross-section or hyperbolic as shown in FIG. 2 having enlarged openings through the first and second end portions 90 and 92 to accommodate the arcuate motion of the piston rod 30 as described above.

Further damping of the lateral force 120 acting on the piston rod 30 is provided by the rounded or bullet-shaped outer peripheral edge 102 of the stone shield reacting against the generally vertical wall portion 103 of the stone shield retainer 104. As best shown in FIG. 2, the stone shield retainer 104 includes an opening 105 which receives the second end portion 92 of the stone shield therethrough. The distance between the second end portion 92 of the stone shield and the internal surface of the opening 105 of the retainer is greater than the distance between the rounded end portion 102 and the generally vertically extending wall portion 103 of the retainer, such that the rounded end portion of the radial flange portion 86 first engages the generally vertically extending wall portion 103 before the first end portion 90 of the stone shield engages the internal surface of the opening 34 through the end of the housing 36. This provides an initial damping of the force of the piston rod. Testing has shown that this feature provides improved damping performance of the damping stone shield of this invention.

Figure 3:
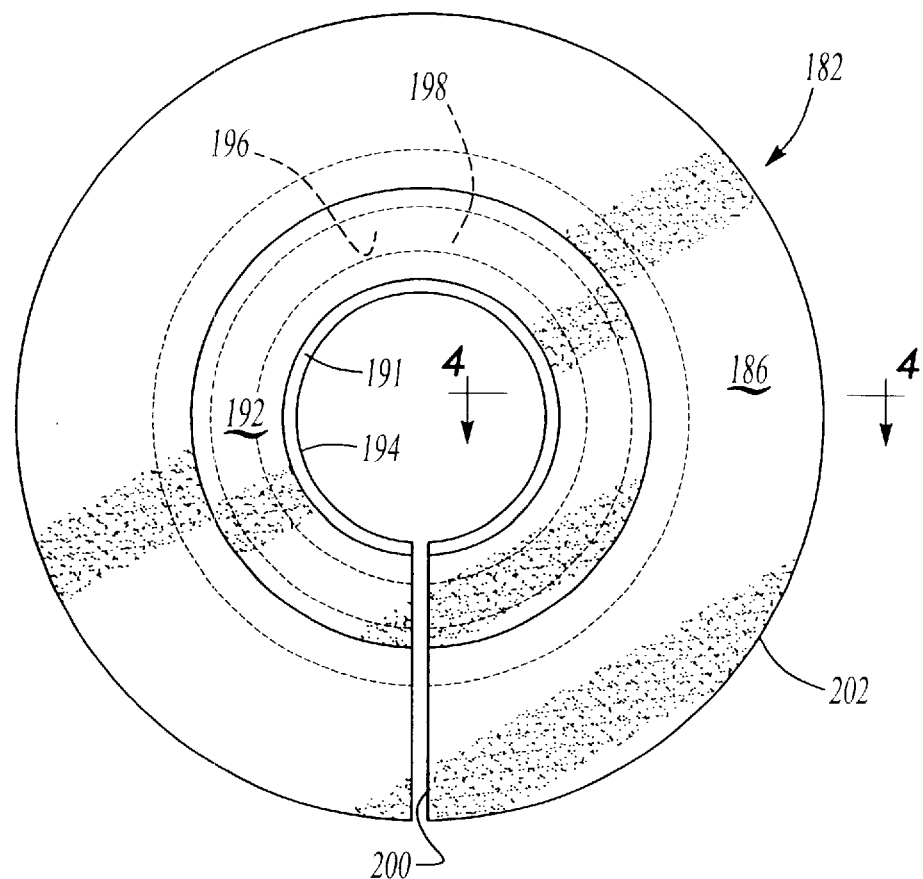
FIG. 3 is a top view of a second embodiment of a damping stone shield.
Figure 4:
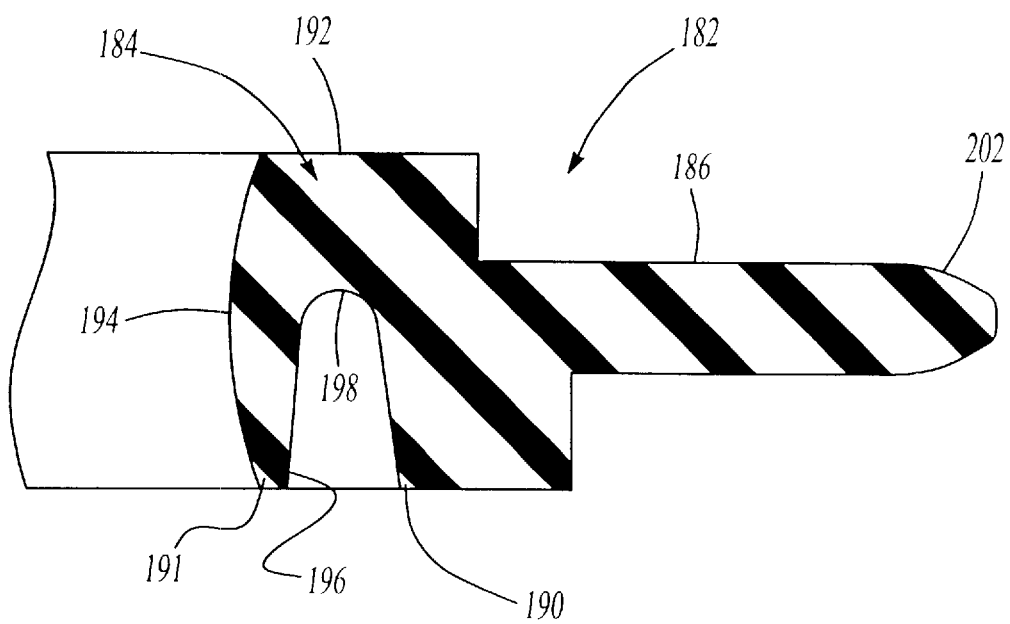
FIG. 4 is a partial side cross-sectional view of the damping stone shield shown in FIG. 3 in the direction of view arrows 4—4.

FIGS. 3 and 4 illustrate a slightly modified embodiment of the damping stone shield 82 shown in FIGS. 1 and 2. In the damping stone shield 182 shown in FIGS. 3 and 4, the annular groove 196 through the first end portion 190 is enlarged compared with the annular groove 96 shown in FIG. 2. The side walls of the annular groove 196 are, however, tapered at approximately the same angle as the annular groove 96 shown in FIG. 2 which, in the disclosed embodiments, is approximately 3° to facilitate removal of the damping stone shield from a mold. Enlarging the opening results in a larger arcuate bottom surface 198 and slightly reduces the thickness of the inner portion 191. Except as described above, the embodiment of the damping stone shield 182 may be identical to the damping stone shield 82 shown in FIGS. 1 and 2 and described above. The reference numbers of FIGS. 3 and 4 are therefore the same as the reference numbers in FIG. 2 except that 100 has been added to the reference numbers in FIGS. 3 and 4. No further description of the embodiment of the improved damping stone shield 182 is therefore required. It should be noted, however, that the split 200 through one side of the stone shield 182 is best illustrated in FIG. 3, which is identical to the split 100 through the stone shield shown in FIG. 2. As described above, this split permits the stone shield to be assembled on the piston rod 30 after the clevis 54 is assembled on the end of the piston rod.

Having described the preferred embodiments of the damping stone shield of this invention, it will be understood that various modifications may be made to the brake actuator having an improved damping stone shield of this invention within the purview of the appended claims. As set forth above, the damping stone shield of this invention may be utilized with any brake actuator including the dual diaphragm spring brake actuator illustrated in FIG. 1, piston-type brake actuators, etc. Although the preferred configuration of the annular groove 96, 196 through the first end 90, 190 of the annular body portion 84, 184 is preferably tapered or bell-shaped, other configurations may be used provided that the groove dampens the force of the piston rod 30 against the surface of the opening 34 through the end wall 36 of the brake actuator 20 as described above.

What is claimed is:

1. A brake actuator having a damping stone shield, said brake actuator including a housing having an end wall, an opening through said end wall and a piston reciprocal through said end wall opening, said damping stone shield located within said brake actuator housing including an annular body portion surrounding said reciprocal piston having an opening receiving said piston and a first end portion extending at least partially through said brake actuator end wall opening, and said damping stone shield first end portion having a generally annular groove spaced from said body portion opening generally surrounding said piston damping impact of said piston against said brake actuator end wall surrounding said end wall opening.

2. The brake actuator having a damping stone shield as defined in claim 1, wherein said damping stone shield includes a radial flange portion extending from said annular body portion overlying an inner surface of said brake actuator end wall and said annular body portion having a diameter less than said end wall opening allowing said damping stone shield to move laterally within said brake actuator end wall opening with said piston as said piston reciprocates through said end wall opening.

3. The brake actuator having a damping stone shield as defined in claim 2, wherein said stone shield radial flange is integral with said body portion spaced from a second end portion of said annular body portion and said generally annular groove extending through said end portion to adjacent the juncture of said radial flange portion and said radial flange portion spaced from said second end portion.

4. The brake actuator having a damping stone shield as defined in claim 2, wherein said flange portion has a rounded circular outer edge.

5. The brake actuator having a damping stone shield as defined in claim 4, wherein said brake actuator includes a generally cup-shaped retainer located within said housing overlying said end wall and surrounding said damping stone shield, said retainer including a wall portion surrounding said rounded circular outer edge of said stone shield, said outer edge of said flange portion of said stone shield spaced from said wall portion of said retainer a distance less than a distance between said first end portion of said stone shield and said end wall surrounding said opening, such that said stone shield radial flange portion rounded outer edge engages said retainer wall portion before said first end portion engages said brake actuator end wall, damping impact of said piston.

6. The brake actuator having a damping stone shield as defined in claim 2, wherein said flange portion of said damping stone shield is integral with said body portion and said damping stone shield is split through said radial flange portion and said body portion for assembly on said piston.

7. The brake actuator having a damping stone shield as defined in claim 1, wherein said generally annular groove extends through said first end portion of said damping stone shield body portion and fully surrounds said opening through said body portion and said piston.

8. The brake actuator having a damping stone shield as defined in claim 6, wherein said annular groove is tapered having a larger opening at said first end portion of said stone shield body portion then at its inner end portion.

9. The brake actuator having a damping stone shield as defined in claim 1, wherein said opening through said body portion is arcuate having rounded openings to accommodate arcuate reciprocal movement of said brake actuator piston.

10. The brake actuator having a damping stone shield as defined in claim 1, wherein said groove is annular and bell-shaped in cross-section having a rounded bottom surface.

11. The brake actuator having a damping stone shield as defined in claim 10, wherein said groove extends more than halfway through said body portion.

12. A brake actuator having a damping stone shield, said brake actuator including a housing having an end wall, an opening through said end wall and a piston reciprocal through said end wall opening, said damping stone shield located within said brake actuator housing including an annular body portion having a diameter less than said end wall opening and a radial flange portion extending from said annular body portion overlying an inner surface of said brake actuator end wall, said stone shield body portion having an opening receiving said reciprocal piston and a first end portion extending at least partially through said brake actuator end wall opening, and said damping stone shield first end portion having an annular groove spaced from said body portion opening surrounding said piston and damping impact of said piston against said brake actuator end wall surrounding said end wall opening.

13. The brake actuator having a damping stone shield as defined in claim 12, wherein said stone shield radial flange portion is integral with said body portion spaced from a second end portion of said annular body portion and said annular groove extends through said first end portion to adjacent the juncture of said radial flange portion and said second end portion of said body portion.

14. The brake actuator as defined in claim 13, wherein said opening through said body portion is arcuate having rounded openings to accommodate arcuate reciprocal motion of said piston.

15. The brake actuator having a damping stone shield as defined in claim 12, wherein said annular groove is tapered having a larger opening at said first end portion of said body portion than at its end portion.

16. The brake actuator having a damping stone shield as defined in claim 15, wherein said end portion of said annular groove is rounded.

17. The brake actuator having a damping stone shield as defined in claim 12, wherein said flange portion of said stone shield is integral with said annular body portion and said stone shield is split through one side of said flange portion and said annular body portion.

18. The brake actuator having a damping stone shield as defined in claim 12, wherein said annular groove is bell-shaped in cross-section having a rounded bottom surface.

19. The brake actuator having a damping stone shield as defined in claim 12, wherein said annular groove extends more than halfway through said annular body portion.

20. The brake actuator having a damping stone shield as defined in claim 12, wherein said brake actuator includes a generally cup-shaped retainer located within said housing overlying said end wall and surrounding said stone shield, said retainer including a wall portion surrounding said radial flange portion of said stone shield, said radial flange portion of said stone shield spaced from said wall portion of said retainer a distance less than a distance between said first end portion of said stone shield and said brake actuator end wall surrounding said opening, such that said radial flange portion engages said retainer before said stone shield first end portion engages said brake actuator upon movement of said piston rod thereby initially damping said lateral movement.

21. The brake actuator having a damping stone shield as defined in claim 20, wherein said flange portion has a rounded arcuate outer edge.

22. A brake actuator having a damping stone shield, said brake actuator including a housing having an end wall, an opening through said end wall and a piston reciprocal through said end wall opening, said damping stone shield located within said brake actuator housing including an annular body portion surrounding said reciprocal piston having a diameter less than a diameter of said end wall opening and an integral radial flange portion having a diameter greater than said end wall opening overlying an inner surface of said brake actuator end wall, said stone shield annular body portion having an opening therethrough receiving said reciprocal piston, a first end portion extending at least partially through said brake actuator end wall opening and a second end portion extending from said radial flange portion having a diameter less than said first end portion, and said annular body portion including a generally annular groove spaced from said body portion opening surrounding said body portion opening and damping impact of said piston against said brake actuator end wall surrounding said end wall opening.

23. The brake actuator having a damping stone shield as defined in claim 22, wherein said annular groove extends through said first end portion of said stone shield body portion to adjacent the juncture of said radial flange portion and said second end portion of said body portion of said stone shield.

24. The brake actuator having a damping stone shield as defined in claim 22, wherein said annular groove is bell-shaped in cross-section having a rounded bottom surface and an opening at said first end portion of said stone shield larger than adjacent said rounded bottom surface.

* * * * *